US010502195B2

(12) United States Patent
Thomas et al.

(10) Patent No.: US 10,502,195 B2
(45) Date of Patent: Dec. 10, 2019

(54) CLAMPING APPARATUS FOR SECURING A MAIN BEARING OF A WIND TURBINE DURING AN INSTALLATION AND/OR REPAIR PROCEDURE

(71) Applicant: General Electric Company, Schenectady, NY (US)

(72) Inventors: Gregory Clarence Thomas, Saratoga Springs, NY (US); Hunter Ryan Anderson, Muskegon, MI (US); Darrick Adam Vanderwalker, Pattersonville, NY (US); Waylon James Esser, Canova, SD (US); Guido van Duelmen, Luenne (DE); Andreas Thal, Salzbergen (DE)

(73) Assignee: General Electric Company, Schenectady, NY (US)

( * ) Notice: Subject to any disclaimer, the term of this patent is extended or adjusted under 35 U.S.C. 154(b) by 128 days.

(21) Appl. No.: 15/498,655

(22) Filed: Apr. 27, 2017

(65) Prior Publication Data
US 2018/0313336 A1 Nov. 1, 2018

(51) Int. Cl.
*F03D 80/70* (2016.01)
*F16C 33/78* (2006.01)
(Continued)

(52) U.S. Cl.
CPC ............ *F03D 80/70* (2016.05); *F03D 13/10* (2016.05); *F16C 19/385* (2013.01); *F16C 33/78* (2013.01);
(Continued)

(58) Field of Classification Search
CPC .... F16C 2360/31; F16C 19/38; F16C 19/385; F16C 43/04; F16C 33/78; F16C 41/001; F16C 2226/10; F16C 2361/45; Y02E 10/722; Y02E 10/72; F03D 80/00; F03D 80/50; F03D 80/70; F03D 13/10;
(Continued)

(56) References Cited

U.S. PATENT DOCUMENTS 9,447,776 B2 * 9/2016 Munk-Hansen ...... F03D 1/0658
9,556,901 B2 * 1/2017 Wheals .................... F16C 19/52
(Continued)

FOREIGN PATENT DOCUMENTS

JP        2007263305 A  * 10/2007  ............ F16C 19/386
JP        2012154267 A  *  8/2012  ............ F03D 7/0224

OTHER PUBLICATIONS

Machine Translation of JP-2012154267-A (Year: 2012).*
Machine Translation of JP-2007263305-A (Year: 2007).*

*Primary Examiner* — Alan B Waits
(74) *Attorney, Agent, or Firm* — Dority & Manning, P.A.

(57) ABSTRACT

The present disclosure is directed to a clamping apparatus for securing a main bearing of a wind turbine. The clamping apparatus includes a clamp member configured for securement to a seal ring arranged with the main bearing, at least one clamping fastener configured through the clamp member, and at least one jacking fastener configured through the clamp member. Thus, the clamping fastener is configured to tighten the clamp member around the seal ring, whereas the jacking fastener is configured to push against the main bearing when tightened so as to maintain the main bearing in place during and installation and/or repair procedure.

14 Claims, 7 Drawing Sheets

(51) Int. Cl.
*F16C 41/00* (2006.01)
*F16C 43/04* (2006.01)
*F03D 13/10* (2016.01)
*F16C 19/38* (2006.01)

(52) U.S. Cl.
CPC ............ *F16C 41/001* (2013.01); *F16C 43/04* (2013.01); *F05B 2230/60* (2013.01); *F05B 2230/80* (2013.01); *F05B 2240/50* (2013.01); *F05B 2240/54* (2013.01); *F05B 2240/57* (2013.01); *F05B 2240/60* (2013.01); *F05B 2260/30* (2013.01); *F16C 2226/10* (2013.01); *F16C 2360/31* (2013.01); *F16C 2361/45* (2013.01); *Y02E 10/722* (2013.01)

(58) Field of Classification Search
CPC ............ F05B 2240/50; F05B 2240/54; F05B 2240/57; F05B 2240/60; F05B 2230/80; F05B 2230/604; F05B 2230/60; F05B 2260/30; F05B 2260/301
See application file for complete search history.

(56) References Cited

U.S. PATENT DOCUMENTS

| | | | |
|---|---|---|---|
| 2004/0240104 A1 | 12/2004 | Francuski et al. | |
| 2008/0181761 A1* | 7/2008 | Moore | F03D 7/0248 415/1 |
| 2008/0240922 A1* | 10/2008 | Eusterbarkey | F03D 15/10 416/204 R |
| 2010/0044540 A1* | 2/2010 | Knudsen | F03D 80/00 248/226.11 |
| 2012/0134831 A1* | 5/2012 | Tiscareno | F16C 19/08 416/174 |
| 2012/0139257 A1* | 6/2012 | Tobinaga | F03D 13/20 290/55 |
| 2012/0141284 A1* | 6/2012 | Auberon | F03D 1/0675 416/226 |
| 2012/0192391 A1* | 8/2012 | Tobinaga | F03D 7/0224 29/23.51 |
| 2012/0237152 A1* | 9/2012 | Wheals | F16C 19/52 384/548 |
| 2012/0269474 A1* | 10/2012 | Seuberling | F16C 41/04 384/560 |
| 2013/0058784 A1* | 3/2013 | Sorensen | F03D 7/0224 416/1 |
| 2013/0195391 A1 | 8/2013 | Cornelio | |
| 2014/0127018 A1* | 5/2014 | Pasquet | F03D 7/0224 416/153 |
| 2014/0193262 A1* | 7/2014 | Pedersen | F03D 80/70 416/174 |
| 2014/0270612 A1* | 9/2014 | Ebbesen | F03D 1/0658 384/428 |
| 2015/0300313 A1* | 10/2015 | Choi | F03D 1/0658 29/889.1 |

* cited by examiner

CLAMPING APPARATUS FOR SECURING A MAIN BEARING OF A WIND TURBINE DURING AN INSTALLATION AND/OR REPAIR PROCEDURE

FIELD

The present subject matter relates generally to wind turbines, and more particularly to a clamping apparatus for securing a main bearing of a wind turbine during an installation and/or repair procedure.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate member support frame located within the nacelle. More specifically, in many wind turbines, the gearbox is mounted to the bedplate member via one or more torque supports or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to electrical generators. The wind turns the rotor blades, which spin a low speed shaft, i.e. the main shaft. The main shaft is coupled to an input shaft of the gearbox, which has a higher speed output shaft connected to the generator. Thus, the geared drivetrain aims to increase the velocity of the mechanical motion. Further, the gearbox and the generator are typically supported by one or more bearings and mounted to the bedplate member via one or more torque arms or supports.

Over time, the main shaft and associated bearings may become worn and/or damaged due to normal operating loads and forces from the wind acting on the wind turbine components. Unfortunately, repair of main shaft and the main bearings often requires the turbine head to be removed from atop the nacelle and transported to a factory, which can be very time-consuming and expensive. In addition, where the main shaft must be replaced, the associated bearings must be reinstalled onto the new shaft.

Thus, the art is continuously seeking new and improved systems and methods for improving repair and/or replacement of the main shaft and the main bearing, particularly uptower. Accordingly, the present disclosure is directed to a clamping apparatus for securing a main bearing of a wind turbine during an installation and/or repair procedure and methods of using same.

BRIEF DESCRIPTION

Aspects and advantages of the invention will be set forth in part in the following description, or may be obvious from the description, or may be learned through practice of the invention.

In one aspect, the present disclosure is directed to a clamping apparatus for securing a main bearing of a wind turbine. The clamping apparatus includes a clamp member configured for securement to a seal ring arranged with the main bearing, at least one clamping fastener configured through the clamp member, and at least one jacking fastener configured through the clamp member. Thus, the clamping fastener is configured to tighten the clamp member around the seal ring, whereas the jacking fastener is configured to push against the main bearing when tightened so as to maintain the main bearing in place during an installation and/or repair procedure.

In one embodiment, the clamp member may include an upwind plate member and a downwind plate member. More specifically, in certain embodiments, the upwind plate member may include a lip that receives a lip of the seal ring on an upwind side thereof. In further embodiments, the downwind plate member may be configured to engage a downwind side of the seal ring when tightened by the clamping fastener. In additional embodiments, the upwind plate member may include an outer plate and one or more inner plates arranged in a stacked configuration. In such embodiments, the inner plate(s) may have a height that is less than a height of the outer plate so as to further define a gap with the lip of the upwind plate member that receives the lip of the seal ring. In several embodiments, the outer plate and the inner plate(s) may be secured together via any suitable means, such as e.g. bonding or welding.

In another embodiment, the clamp member may be secured to the seal ring after a cover of the main bearing is separated and slid away therefrom.

Thus, in certain embodiments, to install the clamping apparatus between the cover and the main bearing, the clamping and jacking fasteners are first tightened, i.e. to maintain compactness of the apparatus. Further, to secure the clamp member to the seal ring, the clamping and jacking fasteners are then loosened to separate the upwind plate member from the downwind plate member such that the lip of the upwind plate member is slid under the lip of the seal ring. Then, the clamping fastener is retightened to clamp the clamp member to the seal ring. In addition, the jacking fastener is tightened to push against an outer race of the main bearing, i.e. so as to maintain the bearing in place.

In further embodiments, the clamping apparatus may also include at least one spacer positioned between the upwind and downwind plate members. In additional embodiments, the clamping apparatus may include a plurality of threaded jacking fasteners and a plurality of clamping fasteners. Thus, in such embodiments, the clamping apparatus may further include at least one spacer arranged with each of the plurality of jacking fasteners and each of the plurality of clamping fasteners.

In yet another embodiment, the plurality of jacking fasteners may be positioned along edges of the upwind and downwind plate members, whereas the plurality of clamping fasteners may be positioned between the jacking fasteners.

In still further embodiments, the main bearing may be a tapered roller bearing, a spherical roller bearing, a ball bearing, or any other suitable bearing.

In another aspect, the present disclosure is directed to a method for securing a main bearing of a wind turbine. The method includes separating a cover of the main bearing therefrom. Further, the method includes installing a clamping apparatus between the cover and the main bearing. As mentioned, the clamping apparatus has a clamp member, at least one clamping fastener, and at least one jacking fastener. Thus, the method also includes securing the clamp member to the seal ring arranged with the main bearing via the clamping fastener. Moreover, the method includes tightening the jacking fastener such that the jacking fastener pushes against the main bearing so as to maintain the main bearing in place during an installation and/or repair procedure. It should be understood that the method may further include any of the additional step and/or features as described herein.

Thus, in one embodiment, for example, the clamp member may include at least one upwind plate member and at least one downwind plate member. As mentioned, the upwind plate member may have a lip and the downwind plate member may be configured to engage a downwind side of the seal ring when tightened by the clamping fastener.

In further embodiments, the clamping and jacking fasteners may be tightened when installed, i.e. such that the clamping apparatus can be inserted into a small space. Thus, the step of securing the clamp member to the seal ring arranged with the main bearing via the clamping fastener may include loosening the clamping and jacking fasteners to separate the upwind plate member from the downwind plate member, sliding the lip of the upwind plate member under a lip of the seal ring on an upwind side thereof, retightening the clamping fastener to clamp the clamp member to the seal ring, and retightening the jacking fastener to push an end of the jacking fastener against an outer race of the main bearing.

In yet another aspect, the present disclosure is directed to a drivetrain assembly for a wind turbine. The drivetrain assembly includes a main shaft, a main bearing assembly having a main bearing and a cover, a seal ring, and a clamping apparatus. The main bearing includes an inner race, an outer race, and a plurality of roller elements configured therebetween. The seal ring is arranged upwind of and adjacent to the main bearing. The clamping apparatus is arranged between the cover of the main bearing assembly and the roller bearings thereof. Further, the clamping apparatus includes a clamp member secured to the seal ring, at least one clamping fastener configured through the clamp member, and at least one jacking fastener configured through the clamp member. Thus, the clamping fastener is configured to tighten the clamp member around the seal ring, whereas the jacking fastener is configured to push against the main bearing when tightened so as to maintain the main bearing in place during an installation and/or repair procedure. It should be understood that the method may further include any of the additional step and/or features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
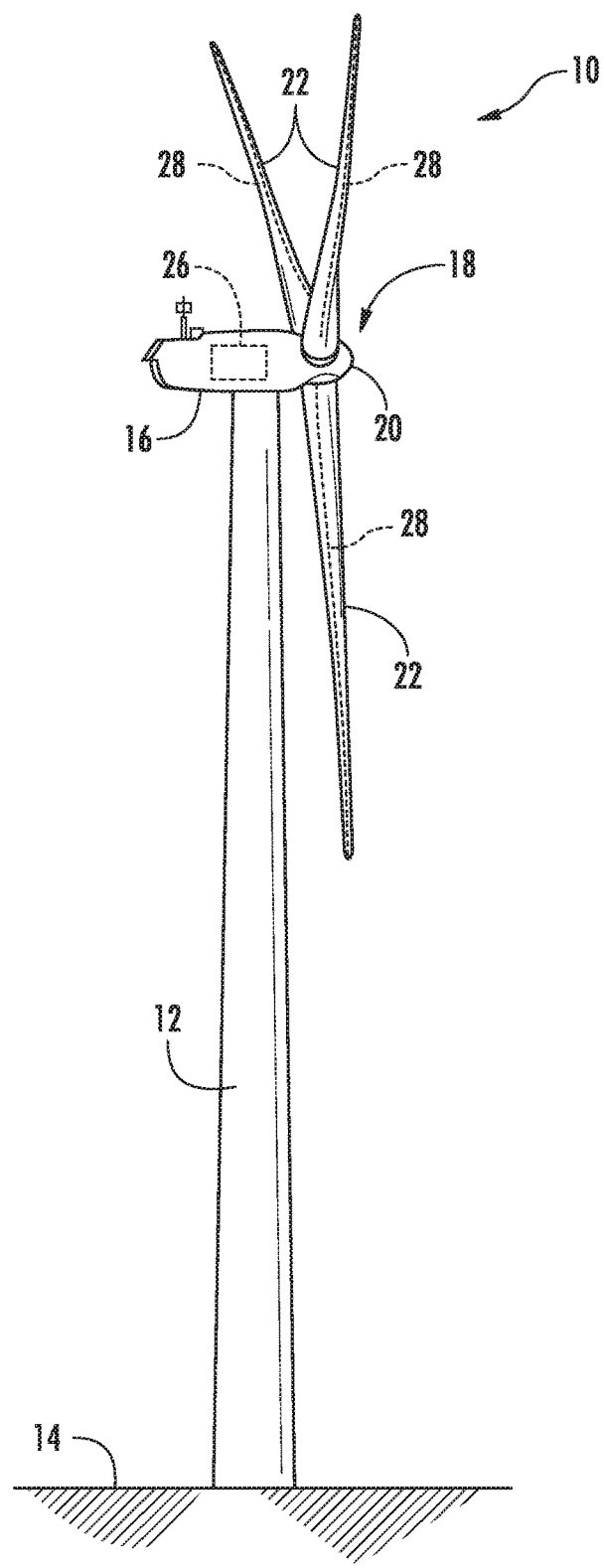
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a clamping apparatus for securing a main bearing of a wind turbine. The clamping apparatus includes a clamp member configured for securement to a seal ring arranged with the main bearing, at least one clamping fastener configured through the clamp member, and at least one jacking fastener configured through the clamp member. Thus, the clamping fastener is configured to tighten the clamp member around a seal ring of the main bearing, whereas the jacking fastener is configured to push against the main bearing (e.g. the outer race of the main bearing) when tightened so as to maintain the main bearing in place during and installation and/or repair procedure.

Thus, the present disclosure provides many advantages not present in the prior art. For example, the system and method of the present disclosure provides easy alignment and accurate installation of a new or repaired main bearing. Further, the clamping apparatus described herein secures the main bearing such that repairs of the bearing or main shaft can be easily made uptower. As used herein, the term "uptower" is intended to be representative of any location of the wind turbine that is above a top portion of a wind turbine tower, for example, any location within or outside of the nacelle while the nacelle is coupled to the top portion of the wind turbine tower.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
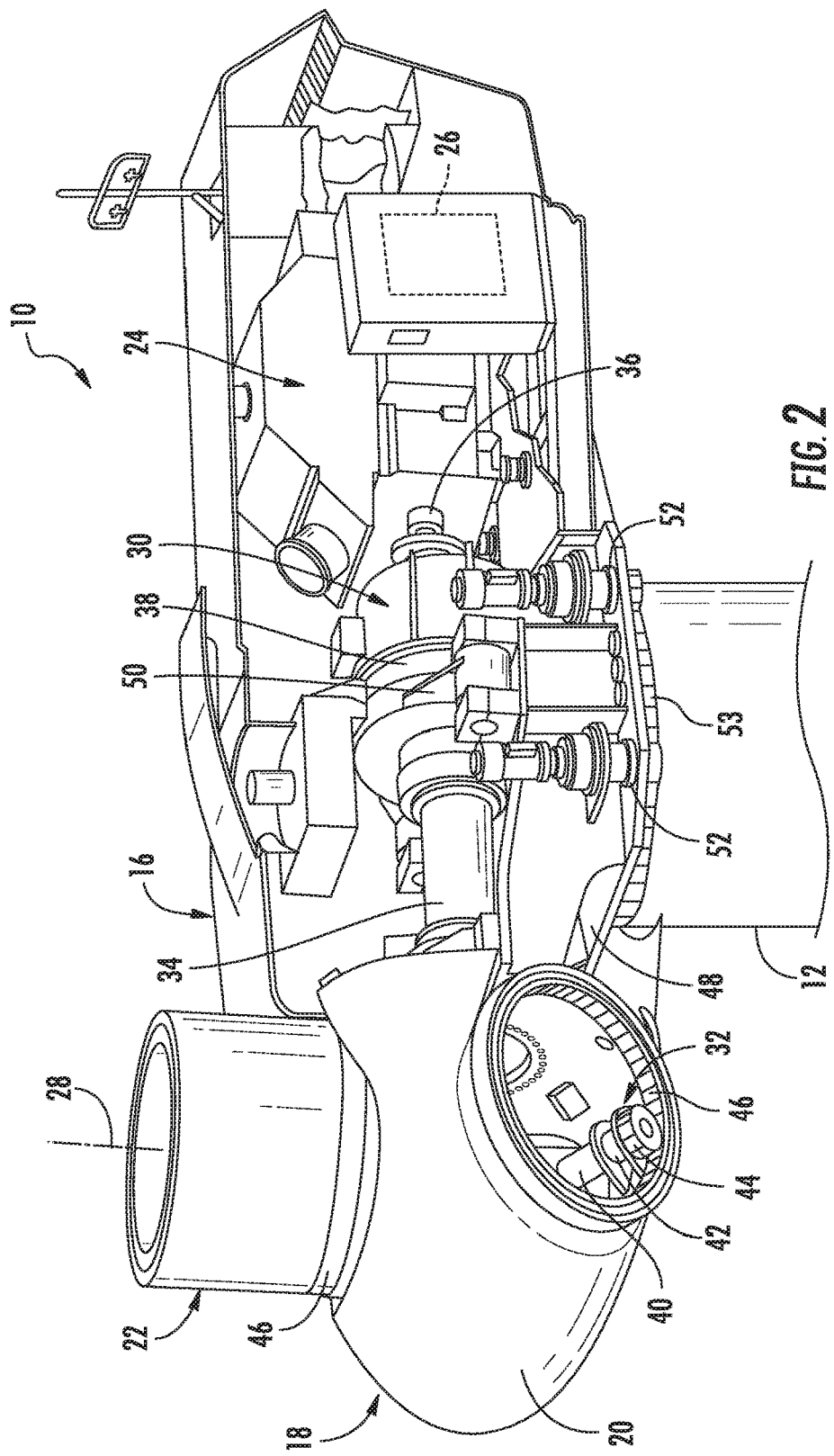
FIG. 2 illustrates a perspective view of a simplified, internal view of one embodiment of a nacelle of a wind turbine according to the present disclosure, particularly illustrating a drivetrain assembly having a single main bearing unit.
Figure 3:
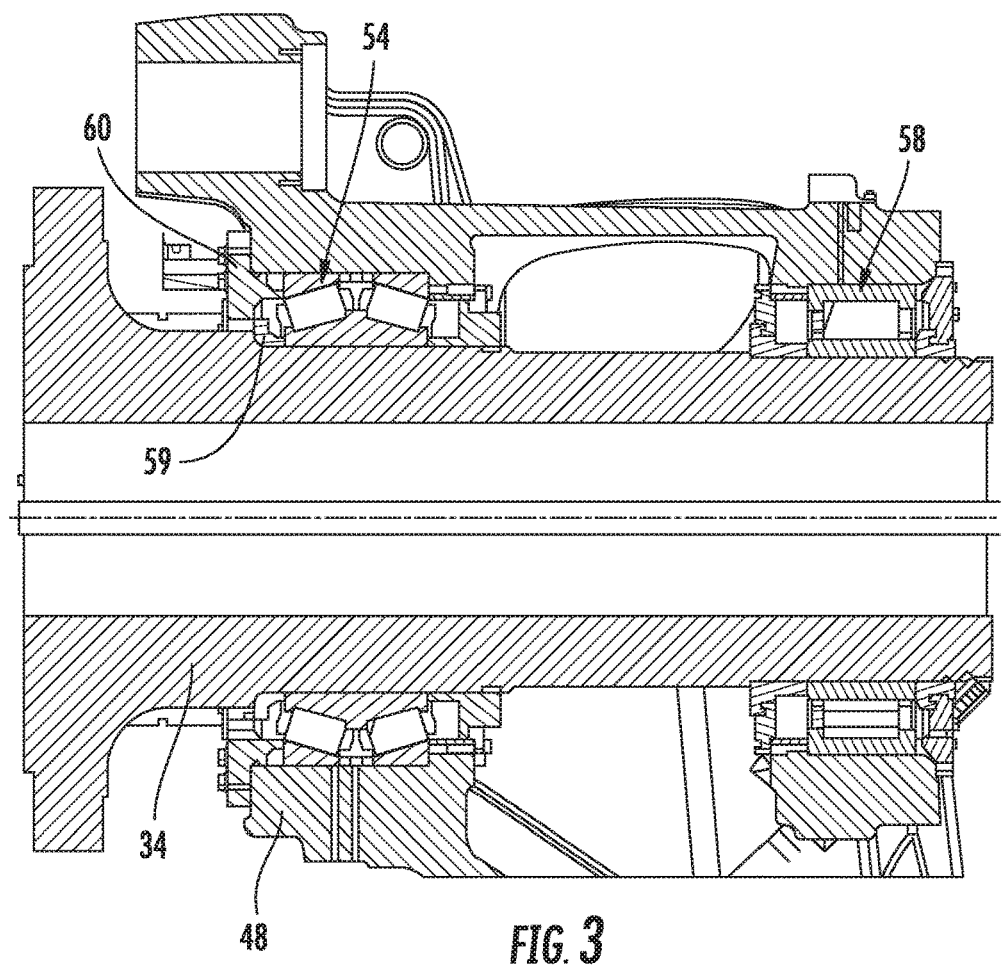
FIG. 3 illustrates a cross-sectional view of one embodiment of certain drivetrain components of a wind turbine according to the present disclosure, particularly illustrating a drivetrain assembly having a dual main bearing unit.
Figure 4:
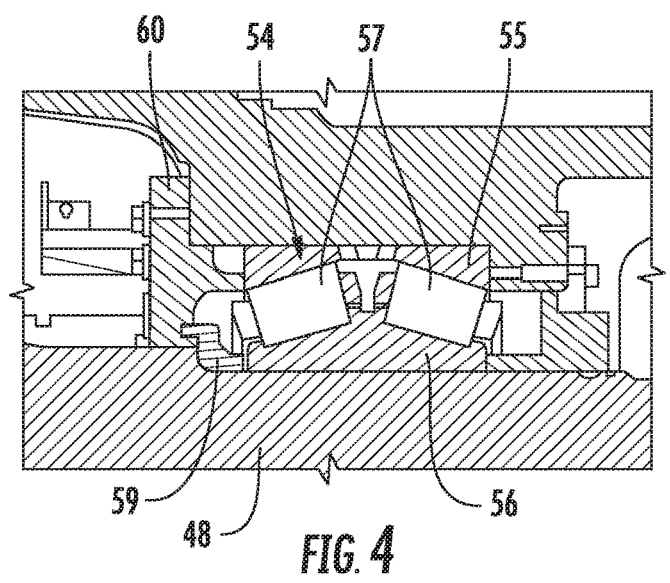
FIG. 4 illustrates a detailed cross-sectional view of the embodiment of FIG. 3.

Referring now to FIGS. 2-4, various views of the drivetrain assembly of a wind turbine, such as the wind turbine 10 of FIG. 1, are illustrated. FIG. 2 illustrates a simplified, internal view of one embodiment of the nacelle 16 of the wind turbine 10 shown in FIG. 1, particularly illustrating certain drivetrain components of a drivetrain assembly having a single main bearing unit. FIG. 3 illustrates a cross-sectional view of one embodiment of several drivetrain components of a dual-bearing drivetrain assembly of the wind turbine 10 according to the present disclosure. FIG. 4 illustrates a detailed cross-sectional view of the embodiment of FIG. 3. As shown in FIG. 2, the generator 24 may be coupled to the rotor 18 for producing electrical power from the rotational energy generated by the rotor 18. Further, as shown in FIGS. 2 and 3, the rotor 18 may include a main shaft 34 rotatable via a main bearing 54 coupled to the hub 20 for rotation therewith. The main shaft 34 may, in turn, be rotatably coupled to a gearbox output shaft 36 of the generator 24 through a gearbox 30. More specifically, as shown in FIGS. 3 and 4, the main shaft 34 is typically supported by one or more bearings 54, 58. For example, as shown, a upwind end of the shaft 34 may be supported by a first or main bearing 54 and a downwind end of the shaft 34 may be supported by a second bearing 58. More specifically, as shown, the main bearing 54 generally corresponds to a tapered roller bearing having an inner race 56, an outer race 55, and a plurality of roller elements 57 arranged therebetween. In further embodiments, the main bearing 54 may be any suitable bearing in addition to tapered roller bearings, including for example, a spherical roller bearing, a ball bearing, or any other suitable bearing. In addition, as shown, the main bearing 54 may be secured in place via a bearing cover 60 that is mounted at the upwind end of the shaft 34, as well as a seal ring 59 configured between the cover 60 and the main bearing 54. For example, in certain embodiments, the seal ring 59 may correspond to a labyrinth seal that prevents leakage of bearing fluids. Further, as shown, the bearings 54, 58 may be mounted to the bedplate member 48 of the nacelle 16 via one or more torque supports 50.

Referring back to FIG. 2, the gearbox 30 may include a gearbox housing 38 that is connected to the bedplate 48 by one or more torque arms 50. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 52 communicatively coupled to the controller 26, with each yaw drive mechanism(s) 52 being configured to change the angle of the nacelle 16 relative to the wind (e.g., by engaging a yaw bearing 53 of the wind turbine 10).

Figure 5:
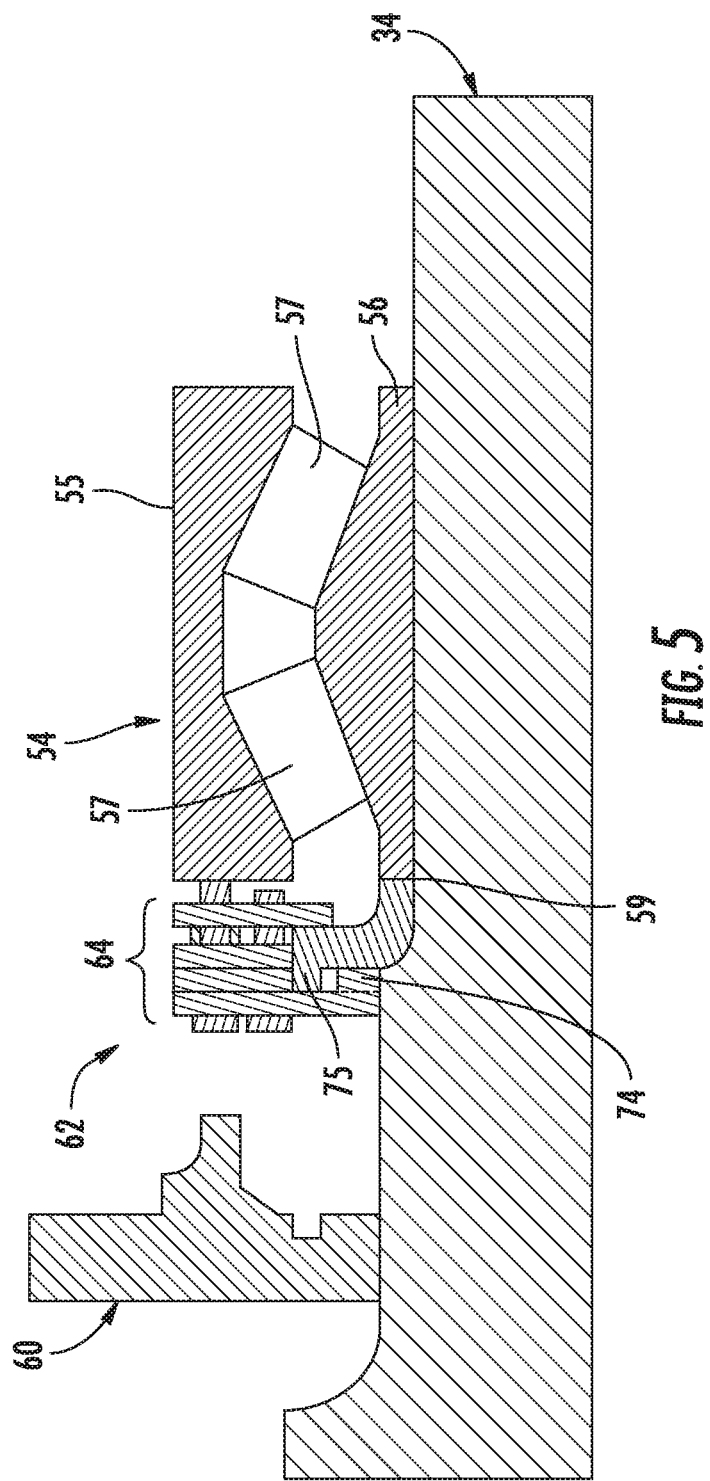
FIG. 5 illustrates a partial, cross-sectional view of one embodiment of the main shaft and the main bearing with a clamping apparatus according to the present disclosure installed thereon.
Figure 6:
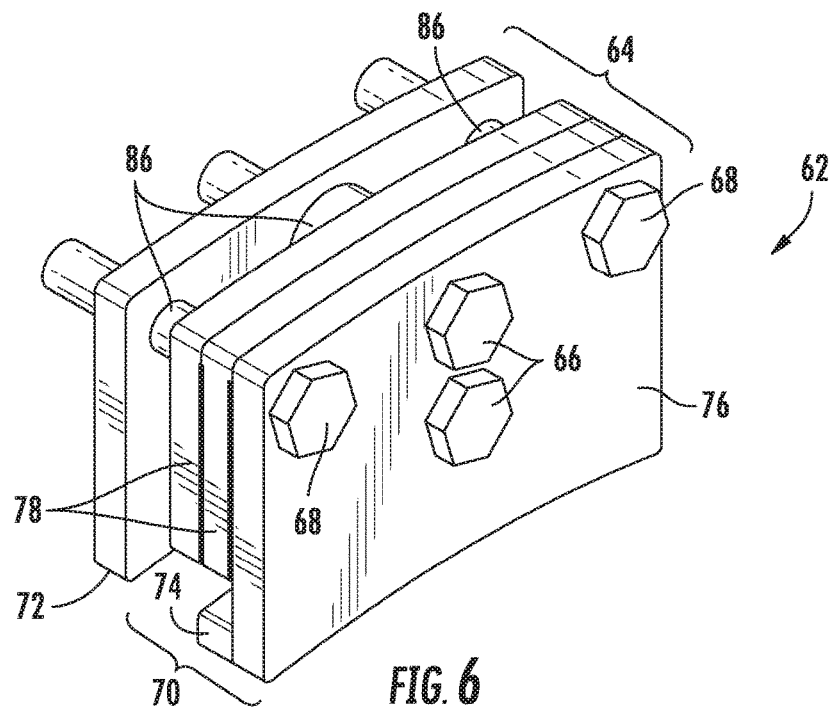
FIG. 6 illustrates a perspective view of one embodiment of the clamping apparatus according to the present disclosure.
Figure 7:
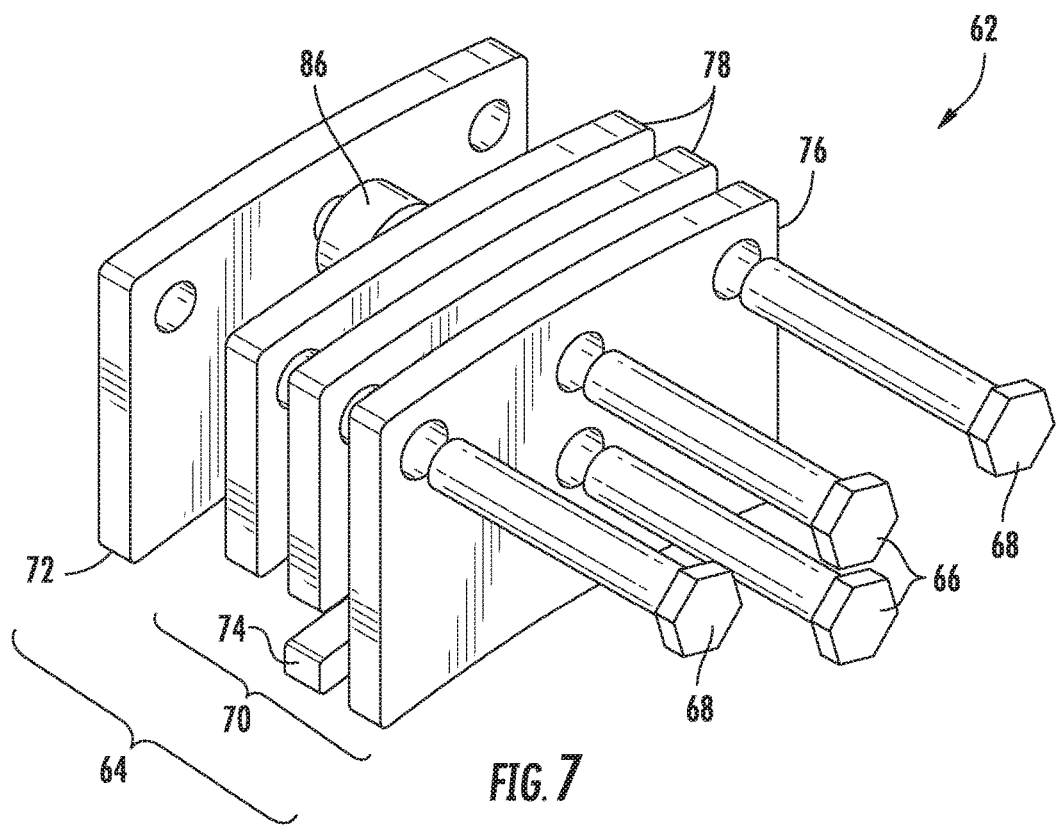
FIG. 7 illustrates an exploded view of one embodiment of the clamping apparatus according to the present disclosure.
Figure 8:
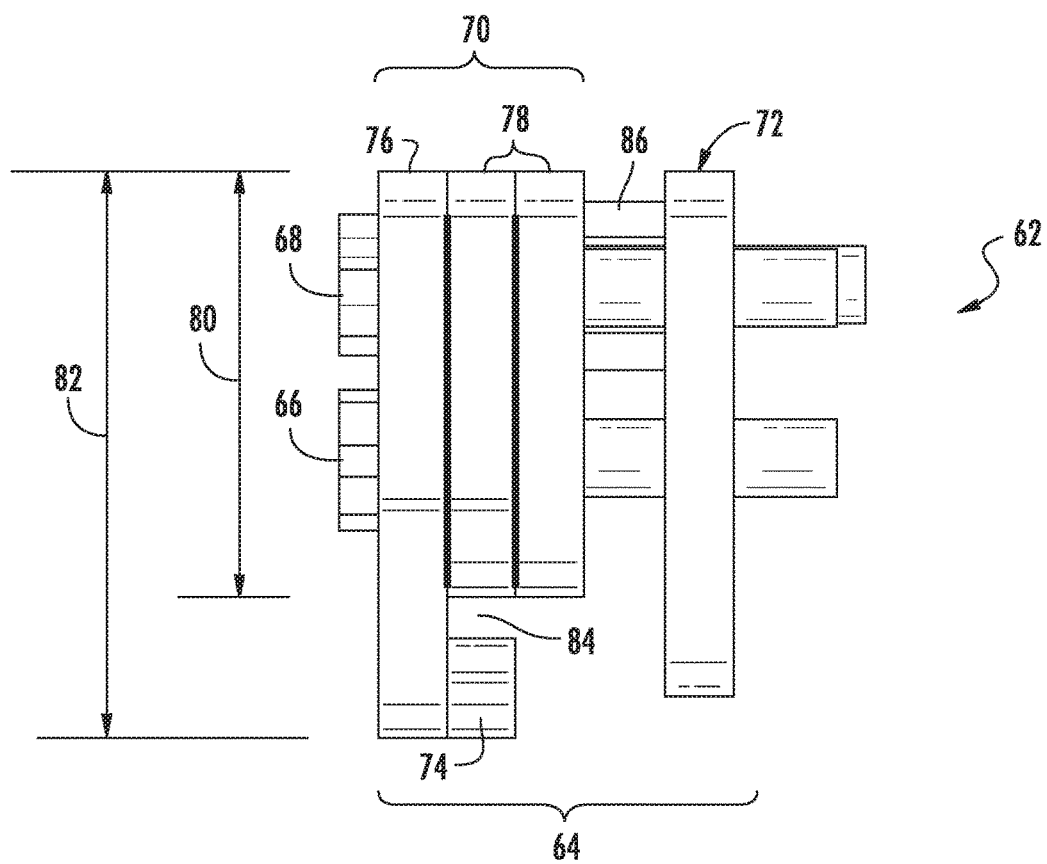
FIG. 8 illustrates a side view of one embodiment of the clamping apparatus according to the present disclosure.

Referring now to FIGS. 5-8, various views of a clamping apparatus 62 for securing the main bearing 54 of the wind turbine 10 during installation and/or repair thereof are illustrated. FIG. 5 illustrates a partial, cross-sectional view of the main shaft 34 and the main bearing 54 with the clamping apparatus 62 installed thereon according to the present disclosure. FIG. 6 illustrates a perspective view of one embodiment of the clamping apparatus 62 according to the present disclosure. FIG. 7 illustrates an exploded view of one embodiment of the clamping apparatus 62 according to the present disclosure. FIG. 8 illustrates a side view of one embodiment of the clamping apparatus 62 according to the present disclosure.

More specifically, as shown, the clamping apparatus 62 includes a clamp member 64 configured for securement to the seal ring 59 arranged with the main bearing 54, at least one clamping fastener 66 configured through the clamp member 64, and at least one jacking fastener 68 configured through the clamp member 64. For example, as shown in the illustrated embodiment, the clamping apparatus 62 may include a plurality of threaded jacking fasteners 68 and a plurality of clamping fasteners 66. In addition, as shown in FIG. 5, the clamp member 64 may be secured to the seal ring 59 after the bearing cover 60 of the main bearing 54 is separated and slid away therefrom. Thus, the clamping fastener(s) 66 is configured to tighten the clamp member 64 around the seal ring 59, whereas the jacking fastener(s) 68 is configured to push against the main bearing 54 (e.g. against the outer race 55 of the main bearing 54) when tightened so as to maintain the main bearing 54 in place during installation and/or repair thereof.

In one embodiment, as generally shown in FIGS. 5-8, the clamp member 64 may include an upwind plate member 70 and a downwind plate member 72. In additional embodiments, as shown particularly in FIGS. 6 and 7, the upwind plate member 70 may include an outer plate 76 and one or more inner plates 78 arranged in a stacked configuration. In such embodiments, the outer plate 76 and the inner plate(s) 76 may be secured together via any suitable means, such as e.g. bonding or welding. Alternatively, upwind plate member 70 may be single part. In addition, as shown particularly in FIG. 5, the upwind plate member 70 may include a lip 74 that receives a lip 75 of the seal ring 59 on an upwind side thereof. Further, as shown, the lip 74 of the upwind plate member 70 may be separately attached to the outer plate 76 or integral therewith. If separately attached, the lip 74 can be secured to the outer plate 76 using any suitable attachment methods such as welding, bonding, or similar. In further embodiments, it should be understood that the lip 74 of the upwind plate member 70 and the lip 75 of the seal ring 59 may have any suitable corresponding cross-sectional shapes such that they can be arranged together and the clamping apparatus secured thereto. In additional embodiments, the downwind plate member 72 may be configured to engage a downwind side of the seal ring 59 when tightened by the clamping fastener (s) 66.

Thus, in certain embodiments, to install the clamping apparatus 62 between the cover 60 and the main bearing 54, the clamping and jacking fasteners 66, 68 are first tightened, i.e. to maintain compactness of the apparatus 62. Further, to secure the clamp member 64 to the seal ring 59, the clamping and jacking fasteners 66, 68 are then loosened to separate the upwind plate member 70 from the downwind plate member 72 such that the lip 74 of the upwind plate member 70 is slid under the lip 75 of the seal ring 59. Then, the clamping fastener(s) 66 is retightened to clamp the clamp member 64 to the seal ring 59. In addition, the jacking fastener(s) 68 is tightened to push against the outer race 55 of the main bearing 54, i.e. so as to maintain the bearing 54 in place.

Referring particularly to FIG. 8, the inner plate(s) 78 of the upwind plate member 70 may have a height 80 that is less than a height 82 of the outer plate 76 so as to further define a gap 84 between the lip 74 of the upwind plate member 70 an ends of the inner plates 78 so as to receive the lip 75 of the seal ring 59 therein.

In further embodiments, as shown in FIGS. 6 and 7, the clamping apparatus 62 may also include at least one spacer 86 positioned between the upwind and downwind plate members 70, 72. Thus, the spacer(s) 86 are configured to transfer loads from the jacking fastener(s) 68 to the downwind plate member 72 and the outer plate 76 of the upwind plate member 70. In addition, the spacer(s) 86 allow for threading of the jacking fastener(s) 68. More specifically, as shown, the clamping apparatus 62 may include a spacer 86 arranged with each of the plurality of jacking fasteners 68 and each of the plurality of clamping fasteners 66. In addition, the various fasteners 66, 68 may be arranged in any suitable arrangement on the clamping apparatus 62. For example, as shown in the illustrated embodiment, the jacking fastener(s) 68 may be positioned along edges of the upwind and downwind plate members 70, 72, whereas the clamping fastener(s) 66 may be positioned between the jacking fastener(s) 68.

Figure 9:
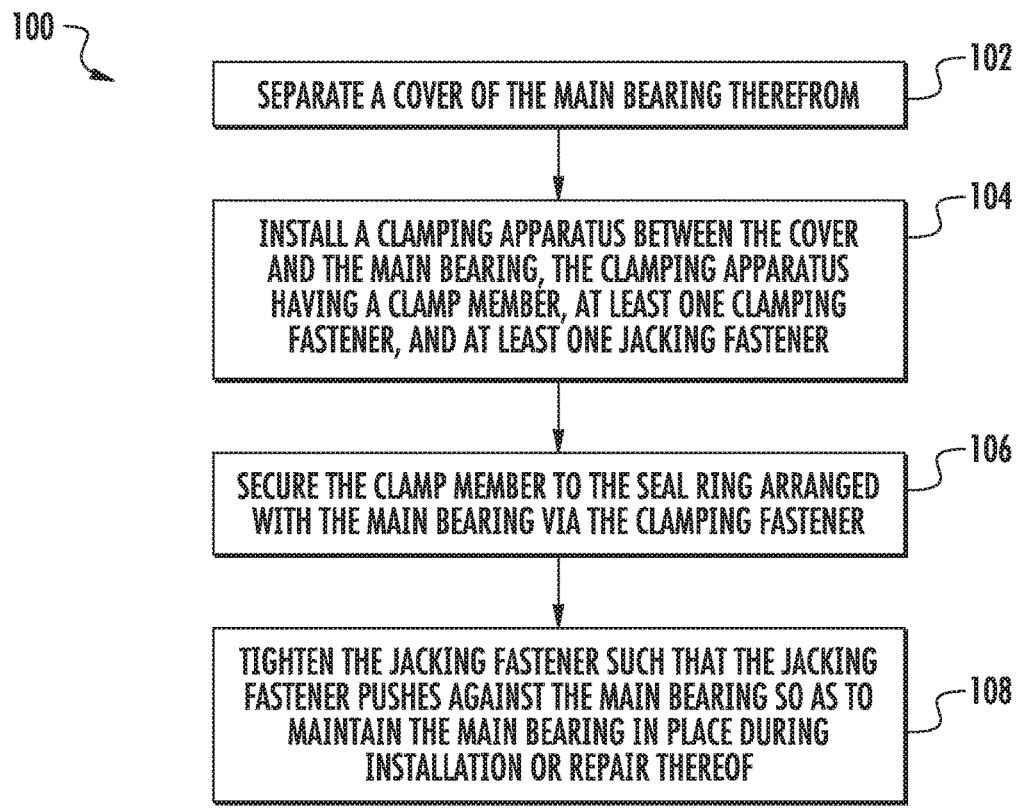
FIG. 9 illustrates a flow diagram of one embodiment of a method for securing the main bearing of the wind turbine during installation and/or repair thereof.

Referring now to FIG. 9, a flow diagram of one embodiment of a method 100 for securing the main bearing 54 of the wind turbine 10 during installation and/or repair thereof is illustrated. As shown at 102, the method 100 includes separating the bearing cover 60 of the main bearing 54 therefrom (FIG. 5). As shown at 104, the method 100 includes installing the clamping apparatus 62 described herein between the cover 60 and the main bearing 54. In further embodiments, the clamping and jacking fasteners 66, 68 may be tightened when installed, i.e. such that the clamping apparatus 62 can be easily inserted into the small space around the main shaft 34. As shown at 106, the method 100 includes securing the clamp member 64 to the seal ring 59 of the main bearing 54 via the clamping fastener(s) 66. More specifically, the clamp member 64 may be secured to the seal ring 59 by loosening the clamping and jacking fasteners 66, 68 to separate the upwind plate member 70 from the downwind plate member 72, sliding the lip 74 of the upwind plate member 70 under the lip 75 of the seal ring 59, retightening the clamping fastener(s) 66 to clamp the clamp member 64 to the seal ring 59. As shown at 108, the method 100 also includes tightening the jacking fastener(s) 68 such that the jacking fastener(s) 68 pushes against the main bearing 54 so as to maintain the main bearing 54 in place during installation and/or repair thereof. Thus, while the main bearing 54 is held in place, the main shaft can be removed or reinstalled within the turbine 10 without the main bearing 54 trying to move down and out of place.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drivetrain assembly for a wind turbine, comprising:
   a main shaft;
   a main bearing assembly comprising a main bearing and a cover, the main bearing comprising an inner race, an outer race, and a plurality of roller elements configured therebetween;
   a seal ring arranged upwind of and adjacent to the main bearing;
   a clamping apparatus arranged between the cover of the main bearing assembly and the roller bearings thereof, the clamping apparatus comprising:
   a clamp member secured to the seal ring;
   at least one clamping fastener configured through the clamp member, the clamping fastener configured to tighten the clamp member around the seal ring; and,
   at least one jacking fastener configured through the clamp member, the jacking fastener configured to push against the main bearing when tightened so as to maintain the main bearing in place during an installation or repair procedure.

2. A system for securing an installed main bearing of a wind turbine, the system comprising:
   a clamp member configured for securement to a seal ring arranged with the main bearing after a cover of the main bearing is separated and slid away therefrom, the clamp member comprising at least one upwind plate member and at least one downwind plate member, the at least one upwind plate member comprising a lip, the at least one upwind plate member further comprising an outer plate and one or more inner plates arranged in a stacked configuration, the one or more inner plates comprising a height that is less than a height of the outer plate, so as to define a gap with the lip of the upwind plate member that receives a lip of the seal ring;

at least one clamping fastener configured through the clamp member, the at least one clamping fastener configured to tighten the clamp member around the seal ring;

at least one jacking fastener configured through the clamp member, the at least one jacking fastener configured to push against the main bearing when tightened so as to maintain the main bearing in place during an installation or repair procedure; and, wherein the at least one downwind plate member is configured to engage a downwind side of the seal ring when tightened by the at least one clamping fastener.

3. The system of claim 1, wherein the outer plate and the one or more inner plates are secured together via at least one of bonding or welding.

4. The system of claim 1, further comprising at least one spacer positioned between the upwind and downwind plate members.

5. The system of claim 4, further comprising a plurality of threaded jacking fasteners and a plurality of clamping fasteners.

6. The system of claim 5, further comprising at least one spacer arranged with each of the plurality of jacking fasteners and each of the plurality of clamping fasteners.

7. The system of claim 5, wherein the plurality of jacking fasteners are positioned along edges of the upwind and downwind plate members and the plurality of clamping fasteners are positioned between the jacking fasteners.

8. The system of claim 1, wherein the main bearing comprises at least one of a tapered roller bearing, a spherical roller bearing, or a ball bearing.

9. A method for securing a main bearing of a wind turbine, the method comprising:

separating a cover of the mail bearing therefrom;

installing a system for securing an installed main bearing having a clamp member, at least one clamping fastener, and at least one jacking fastener, wherein the clamp member comprises at least one upwind plate member and at least one downwind plate member, the at least one upwind plate member comprising a lip, the at least one downwind plate member configured to engage a downwind side of the seal ring when tightened by the clamping fastener, the at least one upwind plate member further comprising an outer plate and one or more inner plates arranged in a stacked configuration, the one or more inner plates comprising a height that is less than a height of the outer plate, so as to define a gap with the lip of the upwind plate member that receives a lip of the seal ring;

securing the clamp member to the seal ring arranged with the main bearing via the at least one clamping fastener, the at least one clamping fastener being configured through the clamp member; and tightening the jacking fastener such that the jacking fastener pushes against the ruin bearing so as to maintain the main bearing in place during an installation or repair procedure, wherein the at least one jacking fastener is configured through the clamp member.

10. The method of claim 9, wherein the clamping and jacking fasteners are tightened when installed.

11. The method of claim 10, wherein securing the clamp member to the seal ring arranged with the main bearing via the clamping fastener further comprises:

loosening the clamping and jacking fasteners to separate the upwind plate member from the downwind plate member;

sliding the lip of the upwind plate member under a lip of the seal ring on an upwind side thereof;

retightening the clamping fastener to clamp the clamp member to the seal ring; and, retightening the jacking fastener to push an end of the jacking fastener against an outer race of the main bearing.

12. The method of claim 9, wherein the clamping apparatus further comprises at least one spacer positioned between the upwind and downwind plate members.

13. The method of claim 12, wherein the clamping apparatus further comprises a plurality of threaded jacking fasteners and a plurality of clamping fasteners.

14. The method of claim 13, wherein the clamping apparatus further comprises at least one spacer arranged with each of the plurality of jacking fasteners and each of the plurality of clamping fasteners.

* * * * *